(12) United States Patent
Tanaka et al.

(10) Patent No.: US 6,657,037 B2
(45) Date of Patent: Dec. 2, 2003

(54) PROCESS FOR PRODUCTION OF POLYAMIDE

(75) Inventors: Kazumi Tanaka, Niigata (JP); Takatoshi Shida, Niigata (JP); Hideyuki Kurose, Niigata (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 0 days.

(21) Appl. No.: 10/038,587

(22) Filed: Jan. 8, 2002

(65) Prior Publication Data
US 2002/0132964 A1 Sep. 19, 2002

(30) Foreign Application Priority Data
Jan. 18, 2001 (JP) .......... 2001-010532

(51) Int. Cl.[7] .......... C08G 69/02; C08G 69/04; C08G 69/06
(52) U.S. Cl. .......... 528/170; 528/310; 528/332; 528/335; 528/336; 528/480; 528/491; 528/492; 528/502 R
(58) Field of Search .......... 528/310, 335, 528/336, 332, 170, 480, 491, 492, 502 R

(56) References Cited

U.S. PATENT DOCUMENTS

| | | | | |
|---|---|---|---|---|
| 5,576,415 A | * | 11/1996 | Tanaka | 528/310 |
| 6,303,741 B1 | * | 10/2001 | Tanaka | 528/332 |
| 6,489,435 B2 | * | 12/2002 | Tanaka et al. | 528/310 |
| 6,559,273 B2 | * | 5/2003 | Shida et al. | 528/310 |

* cited by examiner

Primary Examiner—P. Hampton-Hightower
(74) Attorney, Agent, or Firm—Antonelli, Terry, Stout & Kraus, LLP

(57) ABSTRACT

In the process for producing polyamide of the present invention, a diamine and a dicarboxylic acid are melt-polycondensed in a batch-wise fist polymerizer in the absence of a solvent to produce a middle-stage polyamide. The diamine has a boiling point higher than a melting point of the middle-stage polyamide being produced under inner pressures of the first polymerizer. The middle-stage polyamide is fed into a continuous second polymerizer while controlling the change of relative viscosity within ±0.2, and further polycondensed there to produce the objective polyamide. With such a process, the change of polymerization degree of the middle-stage polyamide during the switching of the polymerization step from a batch-wise manner to a continuous manner is avoided, thereby preventing the variation in quality of the final product.

26 Claims, 2 Drawing Sheets

PROCESS FOR PRODUCTION OF POLYAMIDE

BACKGROUND OF THE INVENTION

1. Field of the Invention

The present invention relates to a process for producing a polyamide from a dicarboxylic acid and a diamine. More particularly, the invention relates to a process with improved production efficiency for producing a polyamide by adding a diamine to a molten dicarboxylic acid in the absence of a solvent to conduct a direct polymerization therebetween.

2. Description of the Prior Art

Polyamide has been generally produced using, as a raw material, a nylon salt or an aqueous solution thereof. The process for the production of polyamide may be carried out in either a batch-wise manner or a continuous manner using such a raw material. For example, in the batch-wise method, an aqueous solution of nylon salt is heated under pressure in one reactor where the polymerization of the nylon salt proceeds in a uniform phase while inhibiting the diamine component from being lost by distillation. Then, after fixing the diamine component by polymerization, a steam in the reaction system is gradually released, and the polymerization reaction is completed finally under ordinary or reduced pressure. In the continuous method, while continuously feeding the raw material, the same steps as in the batch-wise method are sequentially performed, and the polyamide as produced is continuously discharged.

However, the use of the aqueous solution nylon salt as the raw material causes the following problems. The aqueous solution of nylon salt usually has a concentration of about 50%. The presence of a large amount of water requires a highly pressure-resistant reactor because a high pressure is needed to prevent water as the solvent from being distilled off in an initial stage of the polymerization. In addition, a large amount of water used as the solvent must be finally removed together with condensation water generated during the polymerization. Upon the removal of water, there arise various inconveniences such as foaming, solidification of polyamide due to a latent heat of water vaporization, and heat degradation of polyamide which is remained on a wall of the reactor due to a large change of the liquid level during the reaction. Therefore, a counter measure should be laid down against these inconveniences. In addition, the process using a aqueous solution of nylon salt not only requires a large amount of heat energy for the removal of water, but also involves many technical or economical problems such as low polyamide yields per one batch operation.

In the process where a nylon salt is used as the raw material as described in Japanese Patent Publication No 33-15700 and No. 43-22874, many of the above problems are avoided, but additional steps for separation and purification of the nylon salt are required, thereby failing to provide an efficient process for the production of polyamide.

As a polymerization process using a raw material other than the nylon salt and the aqueous solution thereof, there are known a method in which a diamine containing a small amount of water is added dropwise into a dicarboxylic acid at 220° C. or lower under ordinary pressure (Japanese Patent Application Laid-Open No. 48-12390); a method in which a diamine is added dropwise into a molten dicarboxylic acid under ordinary pressure to directly conduct the reaction therebetween (Japanese Patent Application Laid-Open No. 57-200420 and No. 58-111829). These methods are advantageous both technically and economically as compared to those using the nylon salt and the aqueous solution thereof. However, the methods must be practically performed in a batch-wise manner, and it is considerably difficult to perform these methods using a continuous-type polymerizer.

When an apparatus for the production of polyamide is designed, care must be paid to heat supply, surface renewal capability, uniform stirring and mixing, or the like. In order to ensure the same production yield of polyamide between a batch-wise polymerization and a continuous polymerization, the size of the apparatus is limited lower in the batch-wise polymerization as compared with the continuous polymerization. Further, in the batch-wise polymerization, the polyamide is discharged from the reactor preferably within one hour after the molecular weight reaches a predetermined value. Therefore, a pelletizer for polyamide is required to have a capacity capable of treating one batch of polyamide within one hour. With recent rapidly-increasing throughput capacity of pelletizer, a considerably large scale of pelletizer has come to be commercially available. Nevertheless, the capacity is still limited to 10 tons per hour at most. Therefore, in view of the capacity of pelletizer, the maximum production of polyamide in the batch-wise process is limited to 10 tons per one batch. If a larger production is intended, it is necessary to use a plurality of pelletizer, resulting in extremely poor production efficiency. In a method, polyamide produced by the batch-wise process is temporarily stored in a molten state, and then gradually discharged into to a pelletizer where the polyamide is continuously pelletized. This method enables the use of a pelletizer having a small throughput capacity. However, in this method, there arise problems such as change in polymerization degree of the polyamide during storage, break of strands due to inclusion of air bubbles, thereby failing to perform a continuous pelletization.

The batch-wise polymerizer and the continuous polymerizer each have respective merits and demerits, and therefore, the superiority thereof is not simply determined. In general, the continuous polymerizer is suitable for a small-kind and large-quantity production, while the batch-wise polymerizer is suitable for a multikind and small-quantity production. The turning point where the continuous process becomes economically advantageous over the batch-wise process is said to be 10,000 tons or 20,000 tons by annual production. In a production process suitably performed by a batch-wise method or in a batch-wise process where a production amount exceeding the range advantageous for the batch-wise production is intended, it is important to consider how the production efficiency of the batch-wise process is enhanced. Thus, it has been demanded to develop a more efficient process for the production of polyamide.

SUMMARY OF THE INVENTION

An object of the present invention is to provide a process for producing a polyamide with an enhanced production efficiency by adding a diamine to a molten dicarboxylic acid in the absence of a solvent to conduct a direct polycondensation therebetween.

As a result of extensive researches in view of the above object, the inventors have found that, in the process for producing a polyamide by adding a diamine to a molten dicarboxylic acid to conduct a direct polycondensation therebetween in the absence of a solvent, the polymerization process is smoothly switched from a batch-wise manner to a continuous manner and the production efficiency is enhanced by allowing the polycondensation to proceed up to a middle stage in a batch-wise first polymerizer, filling a vapor-phase portion contacting the middle stage polyamide with steam having a predetermined pressure, and then feeding the polyamide to a continuous second polymerizer while maintaining the polymerization degree of the middle stage polyamide substantially constant. The present invention has been accomplished on the basis of this finding.

Thus, in a first aspect of the present invention, there is provided a A process for producing a polyamide by melt-polycondensing a diamine with a dicarboxylic acid in the absence of a solvent, comprising (1) a step of melting the dicarboxylic acid; (2) a step of continuously or intermittently adding the diamine into the dicarboxylic acid kept in a molten state in a batch-wise first polymerizer equipped with a partial condenser to subject the diamine and the dicarboxylic acid to polycondensation at a predetermined molar ratio to produce a middle-stage polyamide having a relative viscosity of 1.4 to 2.7, the diamine having a boiling point higher than a melting point of the middle-stage polyamide under an inner pressure of the first polymerizer; (3) a step of feeding the middle-stage polyamide from the first polymerizer to a melt retention tank, where the middle-stage polyamide is fed into a continuous second polymerizer while controlling a change of relative viscosity of the middle-stage polyamide during the retention in the melt retention tank within ±0.2 by maintaining a vapor phase portion of the melt retention tank at a predetermined pressure by saturated steam; and (4) a step of subjecting the middle-stage polyamide in the second polymerizer to a further polycondensation while removing water from a molten reaction system under reduced pressure, thereby producing a later-stage polyamide.

In a second aspect of the present invention, there is provided a process for producing a polyamide by melt-polycondensing a diamine with a dicarboxylic acid in the absence of a solvent, comprising (1) a step of melting the dicarboxylic acid; (2) a step of continuously or intermittently adding the diamine into the dicarboxylic acid kept in a molten state in a batch-wise first polymerizer equipped with a partial condenser to subject the diamine and the dicarboxylic acid to polycondensation at a predetermined molar ratio to produce a middle-stage polyamide having a relative viscosity of 1.4 to 2.7, the diamine having a boiling point higher than a melting point of the middle-stage polyamide under an inner pressure of the first polymerizer; (3) a step of feeding the middle-stage polyamide from the first polymerizer into a continuous second polymerizer while controlling a change of relative viscosity of the middle-stage polyamide in the first polymerizer within ±0.2 by maintaining a vapor phase portion of the first polymerizer at a predetermined pressure by saturated steam; and (4) a step of subjecting the middle-stage polyamide in the second polymerizer to a further polycondensation while removing water from a molten reaction system under reduced pressure, thereby producing a later-stage polyamide.

DETAILED DESCRIPTION OF THE INVENTION

Figure 1:
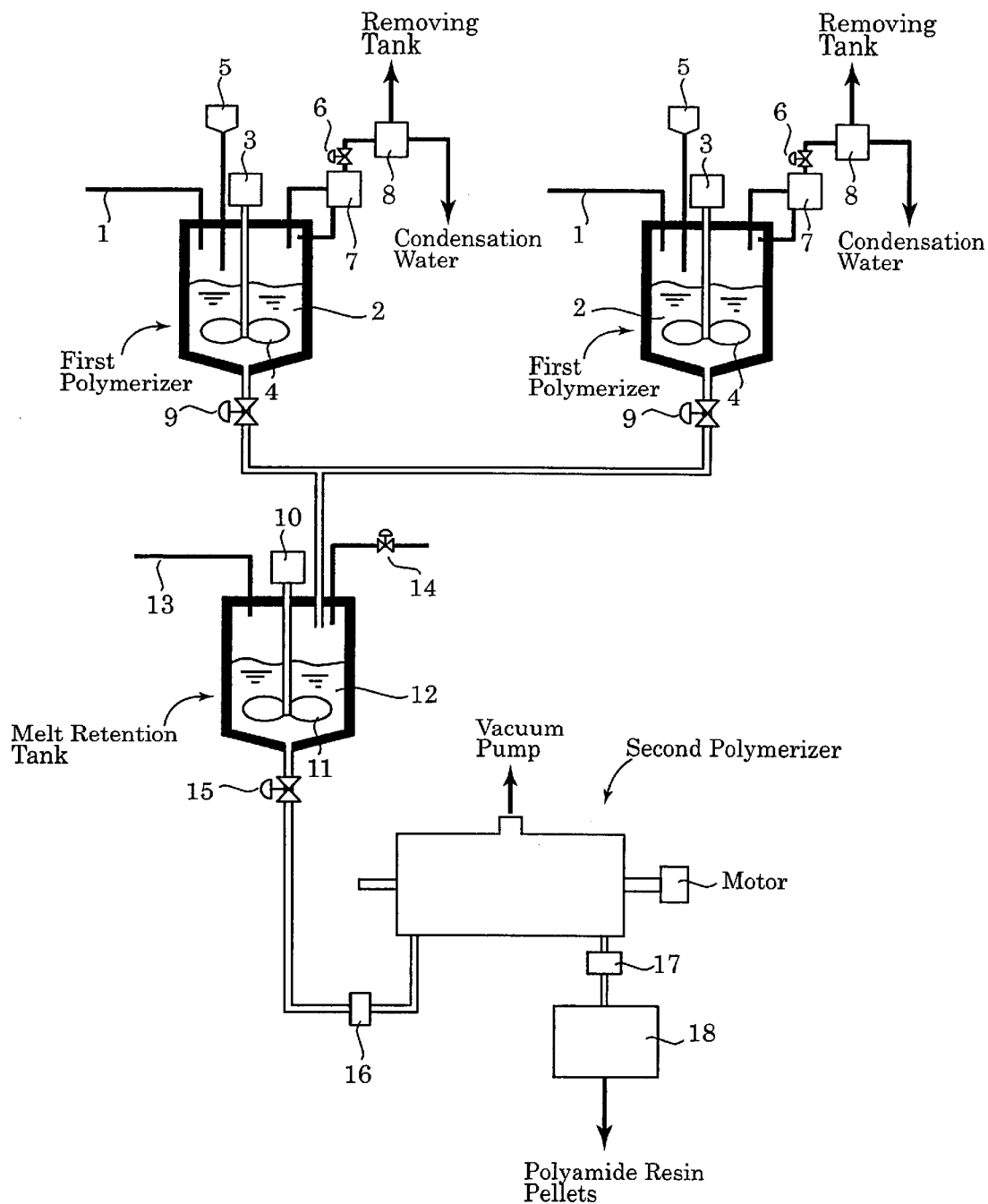
FIG. 1 is a schematic flow diagram showing a first embodied process of the present invention.

In the process of the present invention, the diamine is continuously or intermittently added to the dicarboxylic acid kept in a molten state in the first polymerizer so as to carried out the polycondensation of the diamine and the dicarboxylic acid in a predetermined molar ratio. To keep the molten state, the reaction system must be maintained at a temperature higher than a melting point of the polyamide being produced. The molar ratio of the diamine and the dicarboxylic acid can be adequately controlled by using a diamine having a boiling point higher than the melting point of the resulting polyamide under the inner pressure of the reactor, because the escape of the diamine from the reaction system due to vaporization is prevented. It is economically advantageous to carry out the polycondensation in the first polymerizer under ordinary pressure or slightly increased pressure because a highly pressure-resistant reactor is not needed. Therefore, the use of a diamine having a relatively high boiling point is preferable. Specifically, xylylenediamine and bisaminomethylcyclohexane are preferred in the present invention. Examples of the xylylenediamine include m-xylylenediamine, p-xylylenediamine and o-xylylenediamine. Examples of the bisaminomethylcyclohexane include 1,2-bisaminomethylcyclohexane, 1,3-bisaminomethylcyclohexane and 1,4-bisaminomethylcyclohexane. To produce a polyamide having properties suitable for practical use, the use of a diamine containing m-xylylenediamine in an amount of 50 mol % or higher, more preferably 70 mol % or higher, is preferred when the xylylenediamine is used as the diamine. When the bisaminomethylcyclohexane is used as the diamine, the use of a diamine containing 1,3-bisaminomethylcyclohexane in an amount of 50 mol % or higher, more preferably 70 mol % or higher, is preferred. For example, the boiling point of m-xylylenediamine is 274° C. under ordinary pressure, and the melting point of the polyamide produced from m-xylylenediamine and adipic acid is 243° C. Therefore, when using m-xylylenediamine and adipic acid are used as the starting monomer, the polymerization process of the present invention is extremely adequately performed even under ordinary pressure.

If a highly pressure-resistant reactor is used as the first polymerizer, the process of the present invention may be also carried out using a diamine having a boiling point lower than those of xylylenediamine and bisaminomethylcyclohexane or a diamine mixture of various kinds. In the diamine mixture, the lowest boiling of a diamine component is required to be higher than the melting point of the resulting copolyamide under the inner pressure of the polymerizer. When a diamine having a boiling point higher than the melting point of the dicarboxylic acid but lower than the melting point of the resulting copolyamide is used, the production of copolyamide can be adequately proceeded by completing addition of all of the low-boiling diamine at an initial stage of adding the diamine component, because the melting point of the reaction mixture is substantially the same as that of the dicarboxylic acid when the addition amount of the diamine component is about 50 to about 70 mol % based on the molten dicarboxylic acid.

Examples of another diamine component include tetramethylenediamine, pentamethylenediamine, hexamethylenediamine, heptamethylenediamine, octamethylenediamine, nonamethylenediamine, o-phenylenediamine, m-phenylenediamine and p-phenylenediamine.

Examples of the dicarboxylic acid used as a starting monomer for the polyamide include succinic acid, glutaric acid, adipic acid, suberic acid, sebacic acid, dodecanedioic acid, isophthalic acid, terephthalic acid, phthalic acid, and 2,6-naphthalenedicarboxylic acid. These dicarboxylic acids may be used alone or in combination of two or more. The use of the dicarboxylic acid containing adipic acid in an amount of 70 mol % or higher is preferred to produce a polyamide having properties suitable for practical use. As the component other than the diamine and the dicarboxylic acid, there may be exemplified lactams such as caprolactam, valerolactam, laurolactam and undecanolactam; and aminocarboxylic acids such as 11-aminoundecanoic acid and 12-aminododecanoic acid. These components may be charged into the first polymerizer in advance together with the dicarboxylic acid, or may be dissolved in the diamine, if soluble, and then charged in the form of a diamine solution into the first polymerizer.

When the resulting polyamide has no melting point, i.e., is amorphous, the addition of the diamine is carried out at temperatures at which the resulting polyamide shows a necessary and sufficient fluidity for stirring and mixing.

The process of the present invention is performed until obtaining a middle-stage polymer product by a batch-wise method in a first polymerizer. More specifically, the dicarboxylic acid is maintained in a molten state in the first polymerizer, and the diamine is continuously or intermittently added to the molten dicarboxylic acid so as to allow the polymerization to proceed in a predetermined mole balance between the diamine component and dicarboxylic acid component to be consumed as the constituent components of polyamide (hereinafter referred to merely as "mole balance"). The mole balance at charge may be optionally selected according to the desired mole balance of polyamide, e.g., diamine-rich polyamides, dicarboxylic acid-rich polyamides, or equimolar polyamides. The mole balance at charge may be controlled by a method in which a molten dicarboxylic acid is measured together with a melt tank by a mass-metering device and fed to a polymerizer, and then, a diamine is fed to the polymerizer from a storage tank while measuring the amount of the diamine together with the storage tank by a mass-metering device. To measure the mass of the diamine or the dicarboxylic acid in the present invention, a mass-metering device such as a load cell and a balance is suitably used.

The melting process of the dicarboxylic acid is preferably conducted in an inert atmosphere such as nitrogen atmosphere to avoid coloration due to oxidation. The dicarboxylic acid may be melted in the polymerizer or a melt tank for sole use. The use of the melt tank is preferred for increasing the utilization of the polymerizer.

Upon the addition of the diamine, the molten dicarboxylic acid in the first polymerizer is preferably heated to 160° C. or higher at which the amidation reaction substantially proceeds, and the temperature during the addition is preferably set at a temperature such that oligomers and/or low-molecular polyamides as intermediate products are maintained in a molten state so as to ensure a uniform fluidity of the whole reaction system. More specifically, while stirring the molten dicarboxylic acid in the first polymerizer, the diamine is continuously or intermittently added thereto. The reaction mixture is successively heated to a predetermined temperature and maintained there during the addition of the diamine. Since the temperature rise rate depends on heat of amidation reaction, latent heat of vaporization of condensation water, supplied heat quantity or the like, the addition speed of the diamine is appropriately controlled such that the temperature of the reaction mixture at the completion of the diamine addition reaches a temperature not less than the melting point of polyamide and not higher than the melting point +35° C., preferably the melting point +15° C., and more preferably the melting point +5C. The inner pressure of the first reactor during the diamine addition is not particularly restricted, and is preferably controlled to a pressure under which the diamine has a boiling point not less than the melting point of the reaction mixture. Specifically, the inner pressure is preferred to be ordinary pressure or higher.

Condensation water generated with progress of the polymerization is removed by distillation from the reaction system using a partial condenser and a total condenser while keeping the partial condenser at 100 to 120° C. when the polymerization is performed under ordinary pressure. The diamine vapor distilled off together with the condensation water from the reaction system, the vapor of sublimed dicarboxylic acid, etc. are separated from steam in the partial condenser and then recycled to the first polymerizer.

Like the conventional pressure method using an aqueous nylon salt solution, the escape of the reactants, particularly the diamine, from the reaction system by distillation is inevitable in the process of the present invention. Therefore, the first polymerizer should be provided with a partial condenser, with which the loss of the diamine can be effectively avoided.

In the process of the present invention, after completing the diamine addition, the inner pressure of the first polymerizer is preferably maintained under ordinary or higher pressure for a predetermined time, specifically for at least 5 min, preferably for at least 10 min. At the initial stage of the diamine addition, the reaction rate, i.e., the fixing speed of the diamine is extremely high because the carboxyl groups are present in large excess relative to the diamine. On the contrary, at the time when the diamine addition is completed, the most part of the carboxyl groups has been consumed, so that the fixing speed of the diamine is extremely low as compared to that of the initial stage. Also, since the agitation efficiency of the reaction mixture becomes low with increasing polymerization degree, this unfavorably acting against the fixation of the diamine. The non-fixed diamine is present in the reaction mixture or a vapor-phase portion of the first polymerizer, or condensed in the partial condenser and returned to the reaction mixture. The non-fixed diamine is fixed by maintaining the reaction mixture in molten state under ordinary or higher pressure for a predetermined time after the completion of the diamine addition, thereby accurately reflecting the mole balance at charge to the polyamide.

The polymerization degree of the middle-stage polymer should be maintained unchanged during its transportation to the continuous-type second polymerizer to switch the process from the batch-wise manner to the continuous manner. In the present invention, the polymerization degree is maintained unchanged by temporarily storing the middle-stage polymer in a melt retention tank under a predetermined pressure of steam which is introduced into the vapor phase portion of the melt retention tank (first aspect of the present invention), or alternatively, by retaining the middle-stage polymer in the first polymerizer under a predetermined pressure of steam which is introduced into the vapor phase portion of the first polymerizer (second aspect of the present invention). Namely, after the polymerization proceeds in the batch-wise first polymerizer until the middle-stage polymer is obtained, the molten middle-stage polymer is maintained in a steam atmosphere under a predetermined pressure which does not change the polymerization degree of the middle-stage polymer. Then, the middle-stage polymer is introduced into the continuous-type second polymerizer to conduct a later stage polycondensation.

The relative viscosity of the middle-stage polymer to be maintained under a predetermined pressure of saturated stem is preferably 1.4 to 2.7, more preferably 1.7 to 2.4. When the relative viscosity is reduced to less than 1.4, an excessively longer residence time is required in the second polymerizer. This in turn requires to increase the scale of the expensive second polymerizer, thereby making the process economically disadvantageous. When the relative viscosity exceeds 2.7, the residence time in the first polymerizer is too long, and uniform agitation and mixing are difficult, resulting in the formation of gels or fish eyes.

The steam for maintaining the middle-stage polymer under a predetermined pressure prevent the polymerization of the middle-stage polymer from further proceeding, according to the following amidation equilibrium reaction:

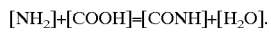

When the steam pressure is too low, the polymerization proceeds to increase the polymerization degree, whereas the depolymerization occurs to reduce the polymerization degree when the steam pressure is too high.

The steam pressure under which the polymerization degree is kept unchanged varies depending upon mole balance, polymerization degree, equilibrium constant, temperature, etc., and is not determined absolutely. However, one skilled in the art can easily determine it from several experiments without undue elaboration. In the process of the present invention, to keep the polymerization degree within the range of 75 to 100, the middle-stage polymer having, for example, a mole balance of 1.000±0.01 may be maintained at 250 to 260° C. under 0.25 to 0.35 MPa in the melt retention tank (first aspect of the present invention) or in the first polymerizer (second aspect of the present invention). The period of time from starting the keeping of the middle-stage polymer under steam atmosphere until starting the feeding into the second polymerizer is preferably 60 min or less, particularly in the second aspect of the present invention. A period of time exceeding 60 min is not favorable for preventing the heat degradation.

The change of relative viscosity may be used as an index of the change of polymerization degree during the storage in the steam atmosphere under pressure. To limit the change of polymerization degree within acceptable range, the change of relative viscosity is preferably limited within ±0.2. When the change of relative viscosity exceeds ±0.2, the variation of polymerization degree (relative viscosity) of a finally obtained polymer is detrimentally large. The variation of polymerization degree can be compensated by varying operation conditions of the second polymerizer such as temperature, pressure and residence time. However, since the second polymerizer is operated in continuous manner, an excessively frequent change of the operation conditions is not practical.

The middle-stage polymer is then fed to the continuous-type second polymerizer and maintained therein in molten state under reduced pressure, thereby removing water from the molten polyamide simultaneously with increasing the polymerization degree. The polymerization degree is increased to such an extent that the relative viscosity increases at least by 0.2. After finally reaching the desired polymerization degree (relative viscosity), the polyamide is continuously discharged from the second polymerizer. By removing water from the molten polyamide, the increase in polymerization degree is promoted and simultaneously air bubbles are also remove, resulting in discharge of stable molten strands from the second polymerizer.

To rapidly remove water from the reaction system by distillation and attain a higher polymerization degree, the second polymerizer is operated under a pressure preferably 90 kPa or less, more preferably 70 kPa or less, still more preferably 50 kPa or less.

As the continuous-type second polymerizer, preferred is a polymerizer which is capable of attaining a high surface renewal property by forming a thin film of the molten polyamide, and has a high evacuation capacity. As such a polymerizer, there may be suitably used a tapered roll-type thin film evaporator (Japanese Patent Publication No. 49-33358), a horizontal twin-screw reactor (Japanese Patent Publication No. 50-15275, No. 50-21514 and No. 53-15753), a scraping-type vertical thin film evaporator (Japanese Patent Application Laid-Open No. 2000-256461), an apparatus having a mechanism for forming falling liquid threads or liquid droplets (U.S. Pat. No. 3,579,483, and Japanese Patent Publication No. 49-12112 and No. 49-20756), or the like. Of these polymerizers, especially preferred is the horizontal twin-screw reactor. By controlling the hold-up amount and the residence time, the continuous-type second polymerizer can be continuously operated more stably. To attain this, the second polymerizer is preferably provided with a gear pump at inlet and outlet thereof. The operation of the gear pump should be controlled synchronously with the operation of the second polymerizer. The later-stage polymer is continuously discharged from the second polymerizer in the form of molten strands, which are cooled and solidified by known methods, and then pelletized.

The present invention will be described in detail below by referring to the attached drawings.

FIG. 1 shows a schematic flow diagram of the process according to the first aspect of the present invention.

(1) A predetermined amount of a solid dicarboxylic acid is charged into a first polymerizer and then melted therein, or a predetermined amount of the dicarboxylic acid previously melted in a melting tank (not shown) is charged into the first polymerizer.

(2) The molten dicarboxylic acid 2 is stirred by a stirrer 2 driven by a motor 3 while introducing nitrogen into the first polymerizer from a nitrogen feed pipe 1, and then a diamine is continuously or intermittently added dropwise from a diamine dropping tank 5 to the molten dicarboxylic acid 2 to allow a polycondensation to proceed. After completing the addition, the reaction mixture is maintained under ordinary or higher pressure for a predetermined period to produce an middle-stage polymer having a relative viscosity of 1.4 to 2.7. During the addition of the diamine, the temperature of the reaction mixture is continuously raised by heating, and the pressure is adjusted by a pressure regulator 6 preferably to ordinary or higher pressure to promote the fixation of the diamine. Condensation water generated with the progress of the polymerization is remove by distillation from the reaction system through a partial condenser 7 and a total condenser 8. A diamine vapor and a dicarboxylic acid vapor due to sublimation escaping from the reaction mixture together with the condensation water are separated from steam in the partial condenser 7 and recycled to the first polymerizer. The middle-stage polymer obtained in the first polymerizer is fed to a melt retention tank by opening a valve 9.

To operate the second polymerizer nonstop, two first polymerizers may be alternately operated so that a predetermined or higher amount of the middle polymer is stored in the melt retention tank at all times.

(3) In the melt retention tank, the molten state is maintained by stirring a molten polyamide 12 by a stirrer 11 driven by a motor 10 while keeping the temperature at a predetermined level. After introducing steam from a stem feed pipe 13, the vapor phase portion of the melt retention tank is adjusted to a predetermined pressure by a pressure regulator 14, thereby inhibiting the change of polymerization degree of the middle-stage polymer. The middle-stage polymer is then continuously fed to the second polymerizer by a gear pump 16 passing through an opened valve 15.

(4) The second polymerizer such as a tapered roll-type thin film evaporator, a horizontal twin-screw reactor and a scraping-type vertical thin film evaporator is maintained at a predetermined temperature under reduced pressure using a vacuum pump to efficiently remove the generated condensation water, thereby allowing the polycondensation to further proceed. To obtain a later-stage polymer having a desired molecular weight, the hold-up amount and residence time of the molten polyamide is controlled by gear pumps 16 and 17 provided at an inlet and an outlet of the second polymerizer. The later-stage polymer thus produced is continuously fed in a molten state from the second polymerizer to a pelletizer 18.

(5) In the pelletizer, the later-stage polymer is formed into continuous molten strands, which are water-cooled and then cut into pellets.

Figure 2:
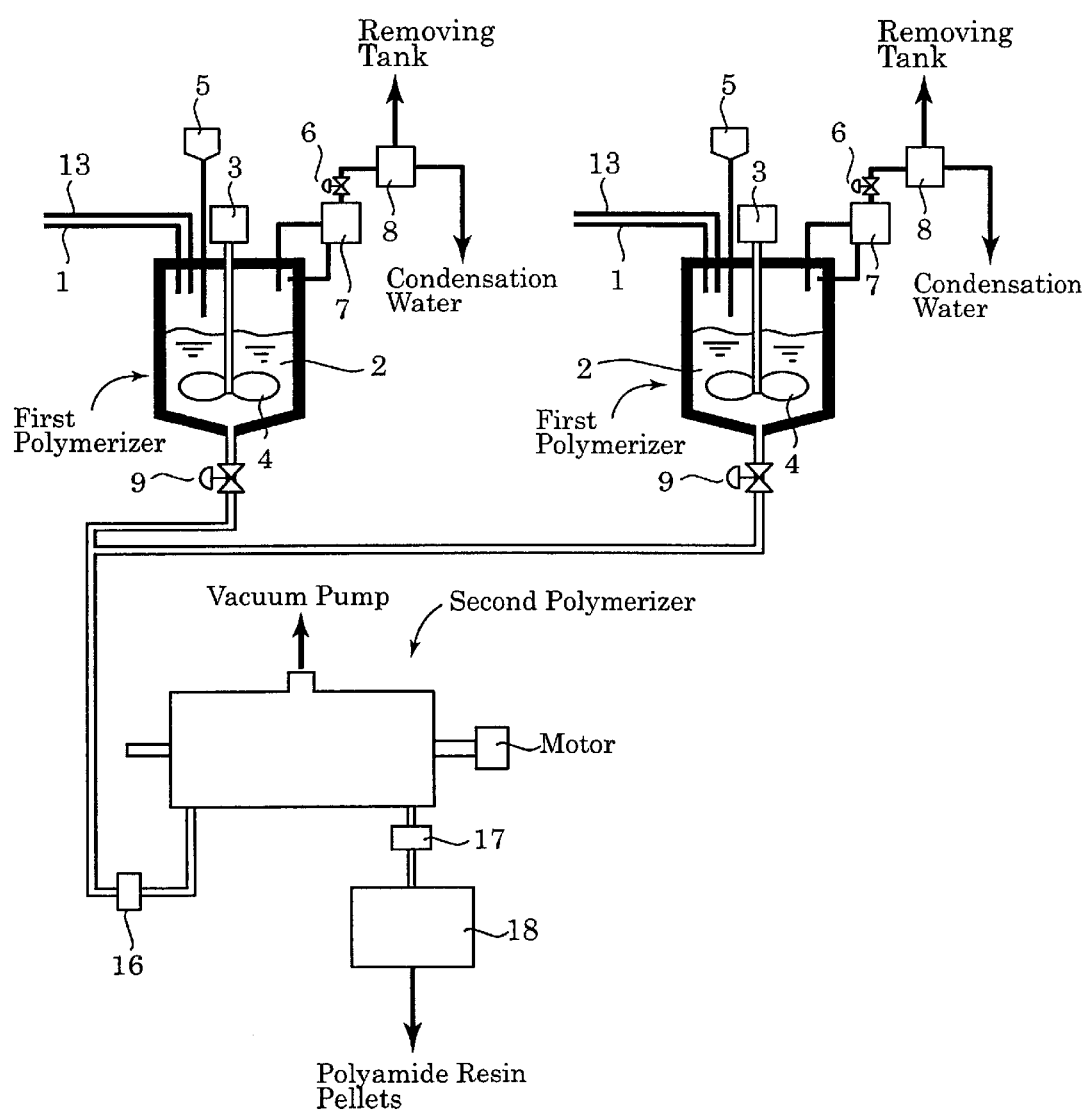
FIG. 2 is a schematic flow diagram showing a second embodied process of the present invention.

FIG. 2 shows a schematic flow diagram of a preferred embodiment according to the second aspect of the present invention.

The process according to the second aspect of the present invention is substantially the same as the process according to the first aspect of the present invention except that the use of the melt retention tank is omitted.

More specifically, the middle-stage polymer is alternately produced in two first polymerizers. The middle-stage polymer produced in each first polymerizer is continuously retained therein while maintaining a vapor phase portion thereof at a predetermined pressure by introducing steam to prevent the middle-stage polymer from changing its polymerization degree. The middle-stage polymer is continuously fed to the second polymerizer from the first polymerizer by alternately switching two first polymerizers.

The process for the production of polyamide according to the present invention has the following effects.

(1) Since the batch-wise polymerizer is used efficiently, the productivity is drastically improved.

(2) Despite the batch-wise reaction, the polyamide is continuously pelletized without deterioration in its quality, resulting in reduction of the size of pelletizer.

(3) The use of a highly pressure-resistant reactor is not required because an aqueous nylon salt solution is not used as a raw material, resulting in reduced capital cost of equipment.

The present invention will be described in more detail by reference to the following examples and comparative examples. In the following examples and comparative examples, the measurements for evaluating properties of polyamide were performed by the following methods after cooling the polyamide.

(1) Amino end group concentration

The polyamide was accurately weighed and dissolved in a phenol/ethanol mixed solution (4/1 by volume) at 20 to 30° C. under stirring. After completely dissolving, the resulting solution was subjected to neutralization titration using a 0.01 mol/L hydrochloric acid under stirring.

The amino end group concentration was calculated from the result.

(2) Carboxyl end group concentration

The polyamide was accurately weighed and dissolved in benzyl alcohol under a nitrogen flow at 160 to 180° C. with stirring. After completely dissolving, the resulting solution was cooled to 80° C. or lower under a nitrogen flow and mixed with 10 ml of methanol with stirring. The solution was then subjected to neutralization titration using a 0.01 mol/L sodium hydroxide aqueous solution. From the result, the carboxyl end group concentration was determined.

(3) Relative viscosity

Into a 96% sulfuric acid, was dissolved one gram of the polyamide, and a dropping time at 25° C. was measured using a Cannon-Fenske viscometer. The relative viscosity of the polyamide was calculated from the following formula:

Relative Viscosity=(dropping time (sec) of specimen)/ (dropping time (sec) of 96% sulfuric acid)

EXAMPLE 1

Into a jacketed 50-L stainless steel reactor equipped with a stirrer, a partial condenser, a total condenser, a nitrogen feed pipe, a pressure regulator, a feed pipe for 1.3 MPa steam and a diamine dropping tank, was charged 10 kg of adipic acid (purity: 99.85 mass %; water content: 0.15 mass %), and then the reactor was purged with nitrogen. The charged adipic acid was heated to 170° C. under stirring while allowing a small amount of nitrogen to flow through the reactor. Then, from the dropping tank, 9.33 kg of m-xylylenediamine (purity: 99.70 mass %) was continuously added dropwise over three hours to the molten adipic acid with stirring under ordinary pressure. During the dropwise addition, the inner temperature was continuously raised to 250° C. Condensation water which was generated as m-xylylenediamine was added was removed from the reaction system through the partial condenser and the total condenser. During the operation, the maximum temperature at a top of the partial condenser was 101° C.

After completing the dropwise addition of m-xylylenediamine, the stirring was further continued for 20 min under ordinary pressure while raising the temperature at a rate of 0.2° C./min, thereby promoting the fixation of m-xylylenediamine. Thereafter, 1.3 MPa steam was introduced into the reactor and the pressure of the vapor phase portion of the reactor was adjusted to 0.3 MPa by the pressure regulator. Ten minutes after the pressure reached 0.3 MPa, the discharge of the resulting polyamide was started, and a whole amount of the polyamide was discharged over 90 min. During the discharge, the stirring was continued while keeping the pressure of the vapor phase portion at 0.3 MPa and the inner temperature at 255±1° C. The results of analysis of the discharged polyamide are shown in Table 1. The mole balance of the polyamide (m-xylylenediamine/adipic acid) calculated from the end group concentrations was 0.999.

Comparative Example 1

The same procedure as in Example 1 was repeated except that the vapor phase portion of the reactor was maintained at 0.5 MPa by dry nitrogen after completing the fixation of m-xylylenediamine. The results of analysis of the discharged polyamide are shown in Table 1. The mole balance of the polyamide (m-xylylenediamine/adipic acid) calculated from the end group concentrations was 0.998.

TABLE 1

|  | Example 1 | Comparative Example 1 |
|---|---|---|
| Pressure (MPa) | 0.3 (steam) | 0.5 (nitrogen) |
| Mole balance | 0.999 | 0.998 |
| Relative viscosity time after starting discharge | | |
| 0 min | 1.73 | 1.69 |
| 60 min | 1.75 | 1.92 |
| 90 min | 1.75 | 2.01 |

As seen from Table 1, the change of relative viscosity of the polyamide during discharging was effectively inhibited by maintaining the vapor phase portion at a predetermined pressure by steam.

EXAMPLE 2

The molten polyamide produced by the same method as in Example 1 was continuously fed to a horizontal twin-screw reactor (L/D: 25; same phase rotation) having a deaeration zone over about 90 min. The pressure of the deaeration zone was maintained at 0.013 MPa, the residence time in the twin-screw kneader was about 15 min, and the temperature of the polyamide discharged from the twin-screw kneader was 260° C. The polyamide were continuously discharged from the twin-screw kneader in the form of strands, which were then cooled by water and continuously pelletized. The results are shown in Table 2.

TABLE 2

| Time after discharged from twin-screw kneader (min) | Relative viscosity |
|---|---|
| 0 | 2.03 |
| 30 | 2.02 |
| 60 | 2.05 |
| 90 | 2.04 |

As seen from Table 2, the relative viscosity of the polyamide discharged from the twin-screw stirrer was extremely stable, and the mode of reaction was smoothly switched from batch-wise reaction to continuous reaction.

EXAMPLE 3

The same reactor as used in Example 1 was charged with 10 kg of adipic acid (purity: 99.85 mass %; water content: 0.15 mass %), and then purged with nitrogen. The charged adipic acid was heated to 170° C. under stirring while allowing a small amount of nitrogen to flow through the reactor. Then, from the dropping tank, 9.73 kg of 1,3-bisaminomethylcyclohexane (purity: 99.86 mass %) was continuously added dropwise over three hours to the molten adipic acid with stirring under ordinary pressure. During the dropwise addition, the inner temperature was continuously raised to 240° C. Condensation water which was generated as 1,3-bisaminomethylcyclohexane was added was removed from the reaction system through the partial condenser and the total condenser. During the operation, the maximum temperature at the top of the partial condenser was 103° C.

After completing the dropwise addition of 1,3-bisaminomethylcyclohexane, the stirring was further continued for 20 min under ordinary pressure while raising the temperature at a rate of 0.2° C./min, thereby promoting the fixation of 1,3-bisaminomethylcyclohexane. Thereafter, the whole amount of the resulting polyamide was discharged into a melt retention tank disposed under the reactor over about 5 min. Then, 1.3 MPa steam was introduced into the melt retention tank and the pressure of the vapor phase portion thereof was adjusted to 0.3 MPa by the pressure regulator. After the pressure reached 0.3 MPa, the polyamide was continuously fed into a horizontal twin-screw reactor of the same type as used in Example 2 from the melt retention tank over about 120 min. During the feeding, the stirring was continued while keeping the pressure of the vapor phase portion at 0.3 MPa and the inner temperature at 245±1° C. The pressure of the deaeration zone was maintained at 0.013 MPa, the residence time in the twin-screw kneader was about 20 min, and the temperature of the polyamide discharged from the twin-screw kneader was 255° C. The polyamide were continuously discharged from the twin-screw kneader in the form of strands, which were then cooled by water and continuously pelletized. The results of the analysis on the polyamide are shown in Table 3. The mole balance (1,3-bisaminomethylcyclohexane/adipic acid) of the polyamide calculated from the end group concentrations was 0.992.

Comparative Example 2

The same procedure as in Example 3 was repeated except that the vapor phase portion of the melt retention tank was maintained under ordinary pressure. The results of analysis of the polyamide discharged are shown in Table 3. The mole balance (1,3-bisaminomethylcyclohexane/adipic acid) of the polyamide calculated from the end group concentrations was 0.991.

TABLE 3

|  | Example 3 | Comparative Example 2 |
|---|---|---|
| Pressure (MPa) | 0.3 (steam) | 0.1 (nitrogen) |
| Mole balance | 0.992 | 0.991 |
| Relative viscosity time after starting discharge | | |
| 0 min | 2.36 | 2.30 |
| 60 min | 2.37 | 2.49 |
| 120 min | 2.35 | 2.54 |

As seen from Table 3, the relative viscosity of the polyamide is kept unchanged by maintaining the vapor phase portion of the melt retention tank at a predetermined pressure by steam.

What is claimed is:

1. A process for producing a polyamide by melt-polycondensing a diamine with a dicarboxylic acid in the absence of a solvent, comprising:

(1) a step of melting the dicarboxylic acid;
   (2) a step of continuously or intermittently adding the diamine into the dicarboxylic acid kept in a molten state in a batch-wise first polymerizer equipped with a partial condenser to subject the diamine and the dicarboxylic acid to polycondensation at a predetermined molar ratio to produce a middle-stage polyamide having a relative viscosity of 1.4 to 2.7, the diamine having a boiling point higher than a melting point of the middle-stage polyamide under an inner pressure of the first polymerizer;
   (3) a step of feeding the middle-stage polyamide from the first polymerizer to a melt retention tank, where the middle-stage polyamide is fed into a continuous second polymerizer while controlling a change of relative viscosity of the middle-stage polyamide during the retention in the melt retention tank within ±0.2 by maintaining a vapor phase portion of the melt retention tank at a predetermined pressure by saturated steam; and (4) a step of subjecting the middle-stage polyamide in the second polymerizer to a further polycondensation while removing water from a molten reaction system under reduced pressure, thereby producing a later-stage polyamide.

2. The process according to claim 1, wherein the first polymerizer comprises two or more batch-wise polymerization reactors.

3. The process according to claim 1, further comprising a step of continuously discharging the later-stage polyamide from the second polymerizer in the form of strands, which are cooled to solidify and then pelletized.

4. The process according to claim 1, wherein the diamine contains xylylenediamine and bisaminomethylcyclohexane in an amount of 70 mol % or higher in total.

5. The process according to claim 1, wherein the diamine contains xylylenediamine in an amount of 70 mol % or higher.

6. The process according to claim 5, wherein the xylylenediamine is m-xylylenediamine.

7. The process according to claim 1, wherein the diamine contains bisaminomethylcyclohexane in an amount of 70 mol % or higher.

8. The process according to claim 7, wherein the bisaminomethylcyclohexane is 1,3-bisaminomethylcyclohexane.

9. The process according to claim 1, wherein the dicarboxylic acid contains adipic acid in an amount of 70 mol % or higher.

10. The process according to claim 1, wherein the continuous second polymerizer is a horizontal cylindrical reactor.

11. A process for producing a polyamide by melt-polycondensing a diamine with a dicarboxylic acid in the absence of a solvent, comprising:

(1) a step of melting the dicarboxylic acid;

(2) a step of continuously or intermittently adding the diamine into the dicarboxylic acid kept in a molten state in a batch-wise first polymerizer equipped with a partial condenser to subject the diamine and the dicarboxylic acid to polycondensation at a predetermined molar ratio to produce a middle-stage polyamide having a relative viscosity of 1.4 to 2.7, the diamine having a boiling point higher than a melting point of the middle-stage polyamide under an inner pressure of the first polymerizer;

(3) a step of feeding the middle-stage polyamide from the first polymerizer into a continuous second polymerizer while controlling a change of relative viscosity of the middle-stage polyamide in the first polymerizer within ±0.2 by maintaining a vapor phase portion of the first polymerizer at a predetermined pressure by saturated steam; and (4) a step of subjecting the middle-stage polyamide in the second polymerizer to a further polycondensation while removing water from a molten reaction system under reduced pressure, thereby producing a later-stage polyamide.

12. The process according to claim 11, wherein the first polymerizer comprises two or more batch-wise polymerization reactors.

13. The process according to claim 11, further comprising a step of continuously discharging the later-stage polyamide from the second polymerizer in the form of strands, which are cooled to solidify and then pelletized.

14. The process according to claim 11, wherein the diamine contains xylylenediamine and bisaminomethylcyclohexane in an amount of 70 mol % or higher in total.

15. The process according to claim 11, wherein the diamine contains xylylenediamine in an amount of 70 mol % or higher.

16. The process according to claim 15, wherein the xylylenediamine is m-xylylenediamine.

17. The process according to claim 11, wherein the diamine contains bisaminomethylcyclohexane in an amount of 70 mol % or higher.

18. The process according to claim 17, wherein the bisaminomethylcyclohexane is 1,3-bisaminomethylcyclohexane.

19. The process according to claim 11, wherein the dicarboxylic acid contains adipic acid in an amount of 70 mol % or higher.

20. The process according to claim 11, wherein the continuous second polymerizer is a horizontal cylindrical reactor.

21. The process according to claim 1, wherein polymerization degree of said middle-stage polyamide is substantially unchanged in feeding said middle-stage polyamide to said continuous second polymerizer.

22. The process according to claim 1, wherein said continuous second polymerizer is a horizontal twin-screw reactor.

23. The process according to claim 1, wherein said continuous second polymerizer is operated under a pressure of 50 kPa or less.

24. The process according to claim 11, wherein polymerization degree of said middle-stage polyamide is substantially unchanged in feeding said middle-stage polyamide to said continuous second polymerizer.

25. The process according to claim 11, wherein said continuous second polymerizer is a horizontal twin-screw reactor.

26. The process according to claim 11, wherein said continuous second polymerizer is operated under a pressure of 50 kPa or less.

* * * * *